(12) United States Patent
Moser

(10) Patent No.: US 11,938,910 B2
(45) Date of Patent: Mar. 26, 2024

(54) NON-RETURN VALVE DEVICE

(71) Applicant: KNORR-BREMSE Systeme fuer Nutzfahrzeuge GmbH, Munich (DE)

(72) Inventor: Juergen Moser, Gerolsbach (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 17/636,657

(22) PCT Filed: Aug. 5, 2020

(86) PCT No.: PCT/EP2020/072023
§ 371 (c)(1),
(2) Date: Feb. 18, 2022

(87) PCT Pub. No.: WO2021/032488
PCT Pub. Date: Feb. 25, 2021

(65) Prior Publication Data
US 2022/0396254 A1 Dec. 15, 2022

(30) Foreign Application Priority Data

Aug. 21, 2019 (DE) ...................... 10 2019 122 452.7

(51) Int. Cl.
*B60T 17/04* (2006.01)
*B60T 17/00* (2006.01)
(52) U.S. Cl.
CPC ............ *B60T 17/04* (2013.01); *B60T 17/004* (2013.01); *B60Y 2410/105* (2013.01)

(58) Field of Classification Search
CPC .. B60T 17/04; B60T 17/004; B60Y 2410/105
See application file for complete search history.

(56) References Cited

U.S. PATENT DOCUMENTS

| | | | |
|---|---|---|---|
| 2,614,793 A | * | 10/1952 | Storm ........................ F16J 1/09 285/918 |
| 4,673,000 A | | 6/1987 | Haerr et al. |
| 5,127,804 A | | 7/1992 | Chappell |

(Continued)

FOREIGN PATENT DOCUMENTS

| | | |
|---|---|---|
| AU | 662875 B3 | 9/1995 |
| CN | 1879937 A | 12/2006 |

(Continued)

OTHER PUBLICATIONS

German-language Office Action issued in German Application No. 10 2019 122 452.7 dated Oct. 26, 2022 (12 pages).

(Continued)

*Primary Examiner* — Thomas J Williams
(74) *Attorney, Agent, or Firm* — Crowell & Moring LLP

(57) ABSTRACT

A non-return valve device has at least part of a flow channel for a fluid and a movable cord-like sealing element arranged in the flow channel. The sealing element is configured such that it can be moved at least partially between a closed position and an open position, wherein, in the open position, a fluid flow is permitted through the flow channel, whereas in the closed position, the fluid flow through the flow channel is blocked by form-fitting engagement with the sealing element.

19 Claims, 3 Drawing Sheets

(56) References Cited

U.S. PATENT DOCUMENTS

| | | | | |
|---|---|---|---|---|
| 5,941,537 | A * | 8/1999 | Wallace | F01D 17/162 |
| | | | | 277/642 |
| 7,695,023 | B2 * | 4/2010 | Fujiwara | H01L 21/67126 |
| | | | | 285/190 |
| 8,580,013 | B2 * | 11/2013 | Hilberer | B60T 17/004 |
| | | | | 95/122 |
| 8,657,939 | B2 * | 2/2014 | Eidenschink | B60T 17/004 |
| | | | | 55/318 |
| 2001/0005982 | A1 | 7/2001 | Gieseke et al. | |
| 2006/0123743 | A1 | 6/2006 | Heer | |
| 2010/0199844 | A1 | 8/2010 | Hilberer | |
| 2012/0073535 | A1 | 3/2012 | Hoppe et al. | |
| 2012/0118157 | A1 | 5/2012 | Eidenschink et al. | |
| 2012/0260615 | A1 | 10/2012 | Sulzyc | |
| 2013/0206003 | A1 | 8/2013 | Hilberer | |
| 2018/0319239 | A1 | 11/2018 | Repela et al. | |
| 2022/0396254 | A1 * | 12/2022 | Moser | B60T 17/04 |

FOREIGN PATENT DOCUMENTS

| | | |
|---|---|---|
| CN | 102449273 A | 5/2012 |
| CN | 102791550 A | 11/2012 |
| CN | 105276247 A | 1/2016 |
| CN | 107110183 A | 8/2017 |
| CN | 108869811 A | 11/2018 |
| CN | 109475805 A | 3/2019 |
| DE | 698 07 482 T2 | 4/2003 |
| DE | 203 04 172 U1 | 9/2004 |
| DE | 103 29 401 A1 | 1/2005 |
| DE | 20 2005 016 282 U1 | 1/2006 |
| DE | 10 2007 011 246 A1 | 9/2008 |
| DE | 10 2009 030 897 A1 | 1/2011 |
| DE | 10 2010 010 882 A1 | 9/2011 |
| DE | 10 2014 002 142 A1 | 8/2015 |
| DE | 10 2016 208 355 A1 | 11/2017 |
| EP | 1 495 934 A2 | 1/2005 |
| EP | 1 669 125 A1 | 6/2006 |
| EP | 2 672 248 A1 | 12/2013 |
| RU | 2532035 C2 | 10/2014 |
| RU | 2561479 C2 | 8/2015 |

OTHER PUBLICATIONS

Russian-language Office Action issued in Russian Application No. 2022106750/11(013960) dated Jul. 11, 2022 (six (6) pages).

International Preliminary Report on Patentability (PCT/IB/326 & PCT/IB/373) issued in PCT Application No. PCT/EP2020/072023 dated Mar. 3, 2022, Including English translation of document C2 (German-language Written Opinion (PCT/ISA/237), filed on Feb. 18, 2022) (nine (9) pages).

International Search Report (PCT/ISA/210) issued in PCT Application No. PCT/EP2020/072023 dated Nov. 2, 2020 with English translation (five (5) pages).

German-language Written Opinion (PCT/ISA/237) issued in PCT Application No. PCT/EP2020/072023 dated Nov. 2, 2020 (six (6) pages).

Chinese-language Office Action issued in Chinese Application No. 202080058989.5 dated Mar. 25, 2023 with English translation (14 pages).

Chinese-language Office Action issued in Chinese Application No. 202080058989.5 dated Dec. 6, 2023 with English translation (14 pages).

* cited by examiner

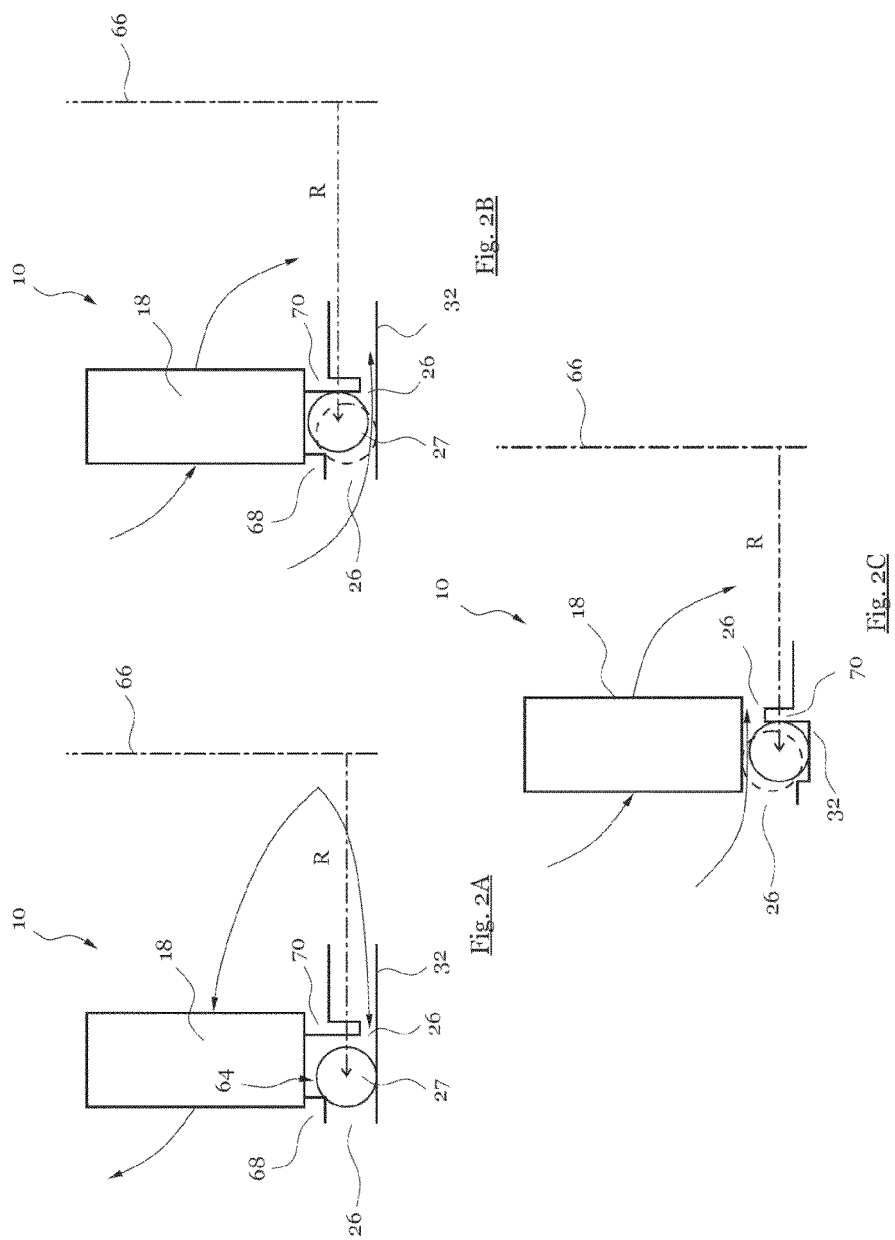

NON-RETURN VALVE DEVICE

BACKGROUND AND SUMMARY OF THE INVENTION

The present invention relates to a non-return valve device which is suitable in particular for fluid treatment in utility vehicles.

Such a non-return valve device can be used in a device for fluid treatment, such as an air dryer cartridge in utility vehicles such as trucks and tractors. These commonly have one or more compressed-air consumers, such as brake systems or air suspension arrangements, which have to be supplied with compressed air. The compressed air is typically provided by a compressor, for example a reciprocating-piston compressor driven by a drive engine of the vehicle. In order to ensure disruption-free operation of the compressed-air consumers, the compressed air provided by the compressor commonly has to undergo further treatment. In the compressed-air treatment systems provided for this purpose, the compressed air is cleaned of dirt particles that were already contained in the intake air and of oil and soot particles that are introduced into the compressed air by the compressor during the compression process, and moisture present in the compressed air is separated off. For this purpose, the compressed-air treatment systems of utility vehicles commonly have air dryer cartridges which dehumidify the compressed air and which can preferably also absorb oil and dirt particles.

Conventional air dryer cartridges have a cartridge housing with a closed housing cover, a desiccant accommodated in the cartridge housing, a fastening flange for closing an open end side of the cartridge housing averted from the housing cover and for fastening the air dryer cartridge to a compressed-air treatment system, and a filter device, such as a coalescence filter, arranged within the cartridge housing for the purposes of purifying the compressed air. During the normal operation of the air dryer cartridge, the compressed air firstly flows through the filter device before entering the desiccant.

For the regeneration operation of the air dryer cartridge, during which flow is caused to pass through the air dryer cartridge in the opposite direction, a bypass channel is generally provided for bypassing the filter device, and a non-return valve is arranged as a bypass of the filter device. The bypass channel is used for the blow-off of oil, which has coalesced on the filter device, during the course of a ventilation pulse.

Conventional bypass devices comprise non-return valves, which are generally formed from an elastomer. These are expensive and their assembly is complex.

The object of the invention is to provide an improved non-return valve device that is easier to assemble.

This object is achieved by means of a non-return valve device having the features of the independent claim. The dependent claims relate to advantageous refinements of the invention.

The non-return valve device according to the invention has at least a first part of a flow channel for a fluid, and a movable, in particular cord-like, sealing element arranged in the flow channel, which sealing element is configured such that it can be moved at least partially between a closed position and an open position, wherein, in the open position, fluid flow is permitted through the flow channel, whereas in the closed position, the fluid flow through the flow channel is blocked by form-fitting engagement with the sealing element.

The device according to the invention has the advantage that the in particular cord-like sealing element is configured such that it can at least in sections be displaced or relocated between the closed position and the open position in the flow channel or can also be moved by deformation, such that a fastening to the flow channel is not necessary for the function of the sealing element. As a result, the sealing element can be of very simple construction, without fastening means. In addition, the construction of the sealing element can be very space-saving.

The device according to the invention may be used for example in devices for the treatment of fluids, such as air, in particular compressed air, or gas, such as in air dryer cartridges. Also conceivable is use in hydraulic or pneumatic devices for vehicles, in particular utility vehicles, in which devices that function on the basis of the principle of a non-return valve can be used.

According to a further embodiment, the device furthermore comprises a housing and a fluid processing device which is arranged in the housing and which is positioned in a flow path of the fluid, wherein the flow channel forms a bypass for the flow path. For example, the device can be used in an air dryer cartridge.

The second part of the flow channel may be arranged in a complementary manner with respect to the first part of the flow channel and may likewise be part of the device, or else may be arranged on another part, such as a fluid treatment system of a utility vehicle, or form a part thereof.

According to one embodiment, the sealing element is connected to and held on the device for fluid treatment by form-fitting engagement. This has the advantage that, by contrast to conventional non-return valves, the sealing element does not have to be specially attached to the device. The sealing element can thus be easily installed and exchanged. In addition, the sealing element can be produced easily because it does not need to have elements for the fastening thereof to the device. It is conceivable, for example, to arrange an annular sealing element along a flow channel that is likewise annular, wherein the sealing element is formed with a circumference which has an oversize in relation to, or which is greater than, the circumference of the flow channel, such that said sealing element is held on and seals off the flow channel, which surrounds the sealing element, owing to the oversize or larger circumference. It would alternatively likewise be conceivable to provide an annular sealing element which surrounds an annular flow channel and which is held on and seals off said flow channel owing to a circumference of the sealing element having an undersize in relation to, or being smaller than, the circumference of the flow channel. With regard to the flow channel, it would be conceivable for this to be configured in the form of multiple annularly arranged openings or sections.

According to a yet further embodiment, the sealing element is an O-ring or a section thereof. An advantage of using an O-ring as a sealing element is that it can be mass-produced inexpensively. In addition, the O-ring can be inserted into the device without needing to be fixed in the device. In particular, the O-ring can be installed without the use of special tools. In addition, a carrier part of the device for the O-ring can be of simplified design without a special fixing geometry. With a suitable counterpart contour for the O-ring, the maximum possible swelling of the O-ring can be compensated, and thus a less expensive O-ring material can be used. The flow channel may have a shape that is complementary to the sealing element or O-ring, in particular may likewise be of annular configuration. The sealing element may be held on the flow channel by way of an oversize, such that the flow channel is sealed off in the absence of impingement by fluid. This construction is suitable in particular for a device in which an annular flow channel surrounds the annular sealing element. Alternatively, the O-ring could also surround an annular flow channel and be held sealingly thereon owing to a smaller circumference.

According to another embodiment, the sealing element is of elongate, rod-like or tubular form with a round, polygonal, oval or elliptical cross section.

According to a yet further embodiment, the sealing element has or is formed from an elastic material. For example, this may be an elastomer material, such as a suitable deformable plastic or natural substance.

According to one embodiment, the fluid treatment device has a filter device, such as a particle filter, a coalescence filter or a nonwoven filter. The fluid treatment device may however also be another component, such as any component for air treatment through which compressed air flows.

According to another embodiment, the sealing element is at least partially movable in a radial direction with respect to the longitudinal axis of the device. In particular, the movement may be a translational movement or rotational movement. It is also conceivable that the movement takes place owing to a deformation of at least one section of the sealing element, in particular compression or expansion in a radial direction or perpendicular with respect thereto, as a result of which the sealing element or at least a section thereof is moved between a closed position and an open position and the flow channel is opened or is closed.

According to a further embodiment, the sealing element is arranged so as to be movable between two surfaces, a first of which is or forms a part of the at least one part of the bypass channel. The fluid flow through the bypass channel can be blocked by form-fitting engagement between the sealing element and at least one of the surfaces. The other surface may be or form a further part of the at least one part of the bypass channel and be arranged opposite the first. One or both surfaces may be structured and have one or more edges, elevations or depressions. For example, one of the surfaces may be in the form of a groove formed by at least two edges and one surface, in particular may be configured as an annular groove or a part thereof. The other, second surface may likewise be a part of the device for compressed-air treatment, though may also be part of another device, such as a compressed-air treatment system, to which the device for compressed-air treatment is connected for the purposes of compressed-air treatment.

According to yet another embodiment, the device for fluid treatment has a cylindrical shape, such as a cartridge, in particular an air dryer cartridge. Other shapes, such as a cubic or cuboid shape, are likewise conceivable.

According to yet another embodiment, the spacing between the two surfaces along the direction of movement of the sealing element corresponds in sections to the height or the diameter of the sealing element, is greater or less than the height or the diameter of the sealing element, or changes along the direction of movement of the sealing element in accordance with a combination of two or more sections with one or more abovementioned spacings.

According to one embodiment, the spacing between the two surfaces along the direction of movement of the sealing element is, at least in one section, greater than the height or the diameter of the sealing element, such that a fluid flow can pass the sealing element between at least one of the two surfaces and the sealing element when the sealing element is positioned in this section.

According to a further embodiment, one or more contact surfaces or sealing edges, which limit the movement of the sealing element, extend between the surfaces at an angle or perpendicularly with respect to the movement direction of the sealing element. Between the one or more contact surfaces or sealing edges, the sealing element, when in contact with said contact surfaces or sealing edges, can seal or block the flow channel by form-fitting engagement. The sealing element is optionally deformed, in particular compressed.

According to yet another embodiment, one or more openings for the passage of the fluid flow are arranged in a wall that extends at an angle or perpendicularly between the surfaces, wherein a fluid flow is blocked by the sealing element when the sealing element closes the one or more openings.

According to another embodiment, one or more openings or depressions are formed in one or both surfaces.

According to a yet further embodiment, the flow channel of the device has one or more openings for the passage of the fluid flow, wherein, when the sealing element is positioned at one of the openings of the one or more openings of the flow channel, said opening is closed by the sealing element and the fluid flow through the flow channel is blocked.

According to a further embodiment, the flow channel of the device has one or more openings for the passage of the fluid flow, wherein, after a movement between the surfaces and across one of the openings of the one or more openings of the flow channel in one of the surfaces or edges, the sealing element is positioned in the flow channel such that the fluid flow through the flow channel is blocked.

According to yet another embodiment, the flow channel of the device has one or more openings for the passage of the fluid flow, wherein, after a movement between the surfaces and across one of the openings of the one or more openings of the flow channel in one of the surfaces, the sealing element is positioned in the flow channel such that the fluid flow through the flow channel is permitted.

According to yet another embodiment, the device has two surfaces arranged concentrically with respect to a longitudinal axis of the device, which surfaces are perpendicular or inclined with respect to the longitudinal axis of the device, and wherein multiple annularly arranged openings are formed in at least one of the surfaces, wherein, in the closed position of the sealing element, a fluid flow through at least one of the openings is blocked by an annular sealing element which is arranged between the surfaces and which surrounds the annularly arranged openings, and in the open position of the sealing element, a fluid flow through at least one of the openings is permitted by virtue of the annular sealing element being arranged such that at least one section of the sealing element is situated between the at least one opening and the longitudinal axis of the device. However, instead of the surfaces or annular surfaces arranged concentrically with respect to a longitudinal axis of the device, use could also be made of an annular gap or an annular groove in which the sealing element is arranged. Instead of complete annular surfaces, gaps or grooves, one or more annular surfaces, gaps or grooves which extend only over an angular range such as 10°, 25°, 45°, and multiples thereof, are also conceivable.

According to a further embodiment, the sealing element can be moved from the open position into the closed position or from the closed position into the open position by means of a fluid.

According to a yet further embodiment, the sealing element can be moved from the closed position into the open position or from the open position into the closed position by way of its elasticity.

According to another embodiment, a first part of the flow channel for bypassing the fluid treatment device is formed by a part of a filter, filter housing or fluid treatment device. Said part may be combined with a complementary part of the flow channel, which may likewise be a part of the device for fluid treatment or may also be formed by another component, such as a fluid treatment system of a utility vehicle, in order to form the flow channel for the fluid flow.

Further features, properties and advantages of the invention will become apparent from the following description of embodiments of the invention with reference to the appended drawing.

BRIEF DESCRIPTION OF THE DRAWINGS

FIGS. 2A-2C are schematic sectional views of devices for compressed-air treatment according to embodiments of the invention.

DETAILED DESCRIPTION OF THE DRAWINGS

Figure 1:
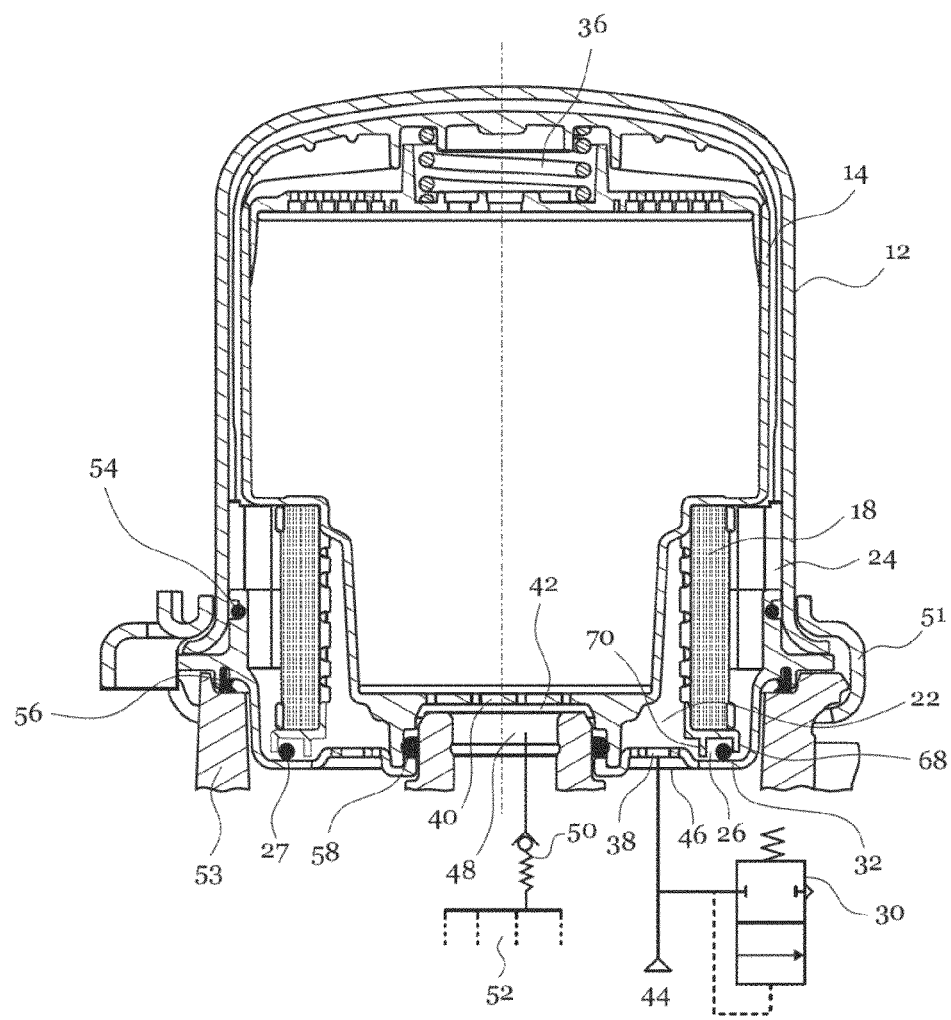
FIG. 1 is a sectional view of a device for compressed-air treatment according to an embodiment.

FIG. 1 shows the construction of a device 10 for compressed-air treatment according to a first exemplary embodiment. The device 10 for compressed-air treatment comprises a housing 12 with a substantially cylindrical wall section. A dryer insert 14 is arranged in the housing 12 and contains a desiccant (not illustrated). Arranged below the dryer insert 14 is a compressed-air treatment component 18, such as a coalescence filter, which extends over the entire circumference of the device 10 for compressed-air treatment. Situated below the coalescence filter is a bypass channel 26 in which there is arranged a sealing element 27 in the form of an O-ring, which sealing element blocks a path from the pre-filter region 22 to the post-filter region 24 along a metal plate 32 provided with passage openings 38, and which sealing element allows the flow in the opposite direction in a manner dependent on the pressure conditions. The bypass channel 26 extends between the bottom side of the coalescence filter and the metal plate 32. The O-ring is inserted into the device 10 for compressed-air treatment without the need to be specially fixed in the device 10. In particular, the O-ring can be installed without the use of special tools. A carrier part of the device 10 for compressed-air treatment for the O-ring can be of simplified design without a special fixing geometry. In the embodiment shown, the carrier part is formed by an outer sealing edge 68 on which the O-ring is held by form-fitting engagement.

The dryer insert 14 is downwardly delimited by a secondary filter 40 and an underlying plate 42 provided with openings. Provided peripherally with respect to the device 10 for compressed-air treatment, or constructed integrally therewith, is a discharge safety valve 30 that belongs to a pressure regulator. Said discharge safety valve is connected, in parallel with respect to a compressed-air supply 44, to the inlet 46 of the device 10 for compressed-air treatment. Compressed-air consumers, such as the four brake circuits 52 indicated here, are connected via a non-return valve 50 to an outlet 48 of the device 10 for compressed-air treatment.

Force is exerted on the dryer insert 14 from above by a spring 36 in order to ensure dense packing of the desiccant within the dryer insert 14. Various seals 54, 56, 58 are provided, wherein, for example, the seal 58 seals off the inlet 46 and the outlet 48 with respect to one another. The device 10 for compressed-air treatment is connected by means of a flange and bayonet fastener 51 to an air treatment system 53 that is indicated in FIG. 1. According to another embodiment, the device 10 for compressed-air treatment may also be connected by means of a thread to the air treatment system 53.

During normal operation, compressed air is supplied from the compressed-air supply 44 to the inlet 46. This compressed air flows through passage openings 38 in the metal plate into the pre-filter region 22 and subsequently through the coalescence filter into the post-filter region 24. Foreign particles are filtered out by the coalescence filter and accumulate at the bottom of the post-filter region 24 and in the bypass channel 26. The air flows onward in an upward direction along the wall of the housing 12 and then into the dryer insert 14 from above, in order to flow through the desiccant and be dried therein. The air subsequently flows through the secondary filter 40, and the plate 42 provided with openings, in the direction of the outlet 48, in order to flow from there via the non-return valve 50 to the consumers, that is to say in particular to the brake circuits 52. The sealing element 27 formed by the O-ring is impinged on with pressure by the air and blocks the bypass channel 26 by form-fitting engagement with the sealing edge 68 and the bottom or the metal plate 32 of the bypass channel 26.

If the discharge safety valve 30 belonging to the pressure regulator now opens, the pressure in the pre-filter region 22 drops. A considerably higher pressure thus prevails in the post-filter region 24 than in the pre-filter region 22, such that the O-ring blocking the bypass channel 26 by form-fitting engagement is pressed radially inward, in the direction of an inner sealing edge 70 of the bypass channel 26. Here, the bypass channel 26 is opened by a translational movement of at least one part of the O-ring 27, and transport of the accumulated foreign particles out of the post-filter region 24 into the pre-filter region 22, and subsequently via the discharge safety valve 30 to the outside of the air treatment system 53, is permitted.

FIGS. 2A-2C schematically show two embodiments of a device 10 for compressed-air treatment having an air treatment component 18, such as one or more filters. The illustrated device 10 for compressed-air treatment has a bypass channel 26 with a sealing element 27 arranged therein. The bypass channel 26 is formed at least in sections by the bottom side of the air treatment component 18 and by an oppositely situated metal plate 32 on the bottom side of the device 10 for compressed-air treatment.

In the embodiment illustrated in FIG. 2A, the sealing element 27 is formed by an O-ring which, in an annular groove 64, extends in a circularly symmetrical manner together with said annular groove about a longitudinal axis 66 of the device 10 for compressed-air treatment. In FIG. 2A, the O-ring and annular groove 64 are shown in cross section and both extend perpendicular to the plane of the drawing. Both the O-ring and the annular groove 64 are illustrated only for one half of the device, but may extend circularly over up to 360°, forming closed rings. It is however also conceivable for both the annular groove 64 and the O-ring to be configured such that they extend only over a sector of a circle, such as 5°, 25°, 45° or a multiple thereof. A linearly or rectilinearly extending groove 64 and a corresponding sealing element 27 arranged therein are also conceivable.

The annular groove 64, which is open downwardly in the embodiment shown, is delimited by an outer sealing edge 68 and an inner sealing edge 70. The outer sealing edge 68 has a height that is less than half of the maximum height of the bypass channel 26 illustrated in FIG. 2A and also less than half of the height of the O-ring, whereas the inner sealing edge 70 has a height that is greater than half of the maximum height of the bypass channel 26 illustrated in FIG. 2A and also greater than half of the height of the O-ring.

The O-ring has an outer radius R that approximately corresponds to or is somewhat greater than that of the outer edge of the annular groove 64 and of the outer sealing edge 68, such that, in the absence of an impingement of compressed air, the O-ring lies with form-fitting engagement against the outer sealing edge 68 of the bypass channel 26 and the bottom of the bypass channel 26. The form-fitting engagement causes the O-ring to be held on the device 10 for compressed-air treatment, in particular on the outer sealing edge 68 thereof. The radius of the O-ring may also be selected such that the O-ring is subjected to compression even in the absence of an impingement of compressed air. In particular, the outer radius of the O-ring may be selected to be 2%, 5%, 10% or 15% greater than the outer radius of the annular groove 64.

In the position of the sealing element 27 shown in FIG. 2A, the O-ring is in form-fitting engagement with the outer sealing edge 68 and the lower surface of the bypass channel 26 and blocks the passage of compressed air from the side of the inner sealing edge 70, which compressed air passes between the lower end of said inner sealing edge and the lower surface into the bypass channel 26 and impinges on the O-ring with pressure in the blocking direction, whilst at the same time the compressed air flows through the air treatment component 18. Depending on the level of the pressure, the O-ring may possibly also be reversibly deformed by the compressed air. This corresponds to the normal operation of the device 10 for compressed-air treatment.

However, embodiments are also conceivable in which the O-ring has an inner radius which corresponds to or is even somewhat smaller than that of the inner sealing edge 70, for example by 2%, 5%, 10% or 15%, such that, in the absence of an impingement of compressed air, the O-ring is held on the inner sealing edge 70 and blocks the bypass channel 26 by form-fitting engagement with the inner sealing edge 70 and with the bottom side of said bypass channel. Such an arrangement may be expedient in particular for embodiments in which, during normal operation, the O-ring is impinged on by compressed air in the blocking direction from the side of the outer sealing edge 68 and is thereby additionally pressed against the inner sealing edge 70 and the bottom side of the bypass channel 26, whilst the compressed air flows through the air treatment component 18, and on the other hand, during regeneration operation, when compressed air impinges from the side of the inner sealing edge 70, the O-ring is forced away from the inner sealing edge 70 and compressed air flows through the bypass channel 26, bypassing the air treatment component 18.

FIG. 2B shows the device according to the same embodiment as in FIG. 2A, but with the position of the sealing element 27 having been relocated, in accordance with the regeneration operation of the device 10 for air treatment, away from the outer sealing edge 68, because the O-ring in the bypass channel 26 is impinged on by compressed air bypassing the air treatment component 18, such that the form-fitting engagement between the bypass channel 26 and the O-ring is eliminated, the bypass channel 26 is opened, and compressed air can escape from the bypass channel 26 between the O-ring and the bottom surface, and possibly also between the O-ring and the top surface, of the bypass channel 26 at the inner sealing edge 70. In the process, the O-ring is pressed in the direction of and possibly against the inner sealing edge 70 without the bypass channel 26 being blocked.

According to the embodiment shown in FIGS. 2A and 2B, the top side of the bypass channel 26 has a structured surface, whereas the bottom side of the bypass channel 26 is formed by a smooth surface. Accordingly, the spacing between the two surfaces on the top and bottom sides of the bypass channel 26 along the direction of movement of the sealing element 27, in particular at the outer sealing edge 68 and in the section of the bypass channel 2 to the left thereof in FIG. 2A, is smaller than the height or the diameter of the sealing element 27, whereas in the middle section in FIG. 2A between the inner sealing edge 70 and the outer sealing edge 68 at which the sealing element 27 is arranged, said spacing is greater than the height or the diameter of the sealing element 27. The middle section is adjoined, to the right, by the inner sealing edge 70, wherein an opening for the passage of compressed air is formed between the bottom end of said inner sealing edge and the bottom side of the bypass channel 26. When compressed air is not being supplied into the bypass channel 26 from the side of the inner sealing edge 70, the sealing element 27 is held on the outer sealing edge 68 at the left-hand edge of the middle section.

FIG. 2B illustrates the situation in which the sealing element 27 is impinged on by compressed air from the side of the outer sealing edge 68, in which case the sealing element 27 is pressed in the direction of the inner sealing edge 70 and the form-fitting engagement between the O-ring and the bypass channel 26 is eliminated, such that the bypass channel 26 opens and compressed air can escape from the bypass channel 26, bypassing the compressed-air treatment component.

FIG. 2C shows a further embodiment of the device 10 for compressed-air treatment, which is similar to the embodiment shown in FIGS. 2A and 2B. By contrast to the embodiment shown in FIGS. 2A and 2B, the structured surface or annular groove 64 is situated opposite the air treatment component 18 on that part of the bypass channel 26 which is formed by the metal plate 32. By contrast, the other part of the bypass channel 26 formed by the bottom side of the air treatment component 18 has a smooth surface. Thus, in the embodiment shown in FIG. 2C, the structure of the bypass channel 26 or the annular groove 64 is arranged on the other side of the bypass channel 26 in relation to that of the bypass channel 26 according to the embodiment shown in FIGS. 2A and 2B. It would also be conceivable for complementary structures for forming a groove for the sealing element 27 to be provided on both sides of the bypass channel 26.

Figure 3A:
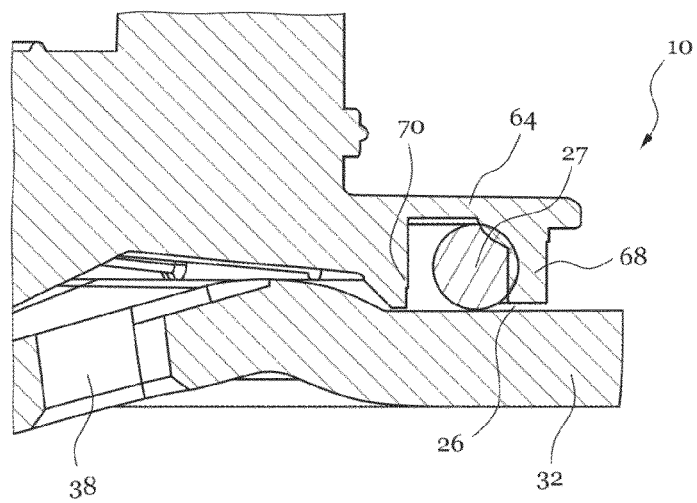
FIGS. 3A-3B are schematic sectional views of devices for compressed-air treatment according to a further embodiment of the invention.
Figure 3B:
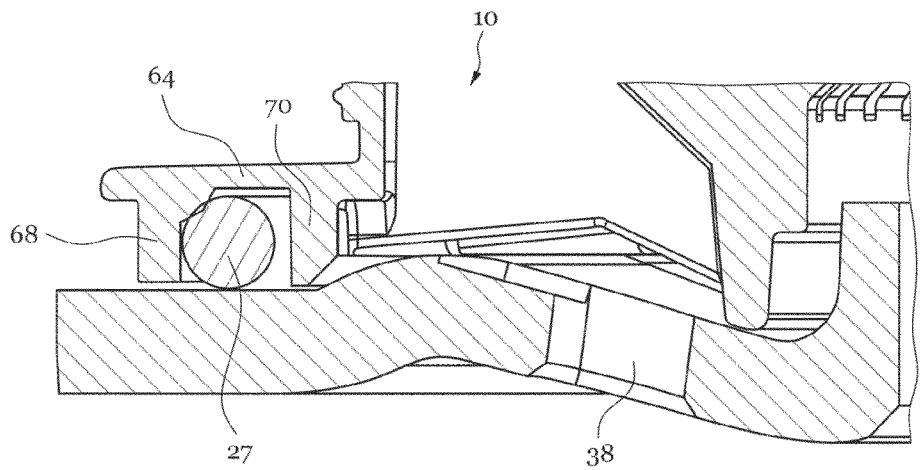

FIGS. 3A and 3B show a further embodiment of the device 10 for compressed-air treatment. According to this embodiment, the device 10 for compressed-air treatment has an annular groove 64 which is independent of a compressed-air treatment component and in which a sealing element 27 in the form of an O-ring is arranged. The annular groove 64 is delimited on the inner side of the device 10 for compressed-air treatment by an inner sealing edge 70 and on the outer side by an outer sealing edge 68. The bypass channel 26 has, on the bottom side, a planar surface which is formed by a metal plate 32. The metal plate 32, which simultaneously forms the bottom side of the device 10, has a passage opening 38, which forms an inlet 46 for compressed air for the device 10 for air treatment. Both FIG. 3A and FIG. 3B show the sealing element 27 or the O-ring in the position in which it blocks the bypass channel 26 during normal operation, in which compressed air flows through the opening 38 into the device and presses the O-ring against the outer sealing edge 68. In the process, the O-ring is somewhat deformed, in particular compressed. At the transition between the outer sealing edge 68 and the bottom of the groove 64, a projection is provided in the groove, which projection presses the O-ring against the bottom side of the bypass channel 26 in order to achieve better form-fitting engagement between the O-ring and the bottom side of the bypass channel 26 during normal operation. Both of the embodiments shown in FIGS. 3A and 3B operate in the same way as the embodiments shown in FIGS. 2A-2C.

Modifications and changes to the invention may be made without departing from the scope of the invention.

LIST OF REFERENCE DESIGNATIONS

10 Device for compressed-air treatment
12 Housing
14 Dryer insert
18 Coalescence filter
26 Flow channel
27 Sealing element
22 Pre-filter region
24 Post-filter region
38 Passage opening
32 Metal plate
36 Spring
40 Secondary filter
42 Plate with openings
30 Discharge safety valve
44 Compressed-air supply
46 Inlet
48 Outlet
50 Non-return valve
51 Flange, bayonet fastener
52 Brake circuits
53 Air treatment system
54 Seal
56 Seal
58 Seal
64 Annular groove
66 Longitudinal axis
68 Outer sealing edge
70 Inner sealing edge

The invention claimed is:

1. A non-return valve device, comprising:
a housing;
a fluid processing device arranged in the housing and positioned in a flow path of a fluid;
at least one part of a flow channel for the fluid defining a bypass for the flow path; and
a movable cord-shaped sealing element arranged in the flow channel, wherein
the sealing element is configured so as to be movable between first and second surfaces without at least partially being fixed to the first and second surfaces and so as to be movable at least partially between a closed position and an open position, wherein at least the first surface forms a part of the at least one part of the flow channel, wherein first and second sealing edges, which limit movement of the sealing element, extend between the first and second surfaces at an angle or perpendicularly with respect to a movement direction of the sealing element, wherein the first and second sealing edges have first and second heights respectively, wherein the first height is greater than the second height, and wherein the first sealing edge is positioned closer to the first surface than the second sealing edge, wherein
in the open position, a fluid flow is permitted through the flow channel, and
in the closed position, the fluid flow through the flow channel is blocked by form-fitting engagement between with the sealing element, the second sealing edge and the first surface.

2. The device as claimed in claim 1, wherein
the sealing element is connected to and held on the device by form-fitting engagement.

3. The device as claimed in claim 1, wherein
the sealing element is an O-ring or a section thereof.

4. The device as claimed in claim 1, wherein
the sealing element is of elongate or cord-shape, rod-shape or tubular form with a round, polygonal, oval or elliptical cross section.

5. The device as claimed in claim 1, wherein
the sealing element has or is formed from an elastic material.

6. The device as claimed in claim 1, wherein
the fluid processing device has a filter in the form of a particle filter, a coalescence filter or a nonwoven filter.

7. The device as claimed in claim 1, wherein
the sealing element is arranged so as to be movable in a radial direction with respect to a longitudinal axis of the device.

8. The device as claimed in claim 1, wherein
a spacing between the two surfaces along a direction of movement of the sealing element corresponds in sections to a height or a diameter of the sealing element, is greater or less than the height or the diameter of the sealing element, or changes along the direction of movement of the sealing element in accordance with a combination of two or more sections with one or more abovementioned spacings.

9. The device as claimed in claim 1, wherein
a spacing between the two surfaces along a direction of movement of the sealing element is, at least in one section, greater than a height or a diameter of the sealing element, such that a fluid flow can pass the sealing element between at least one of the two surfaces and the sealing element when the sealing element is positioned in said section.

10. The device as claimed in claim 1, wherein
one or more openings for passage of the fluid flow are arranged in a wall that extends at an angle or perpendicularly between the surfaces, wherein a fluid flow is blocked by the sealing element when the sealing element closes the one or more openings.

11. The device as claimed in claim 1, wherein
one or more openings or depressions are formed in one or both surfaces.

12. The device as claimed in claim 1, wherein
the flow channel of the device has one or more openings for passage of the fluid flow, wherein, when the sealing element is positioned at one of the openings of the one or more openings of the flow channel, said opening is closed by the sealing element and the fluid flow through the flow channel is blocked.

13. The device as claimed in claim 1, wherein
the flow channel of the device has one or more openings for passage of the fluid flow, wherein, after a movement between the surfaces and across one of the openings of the one or more openings of the flow channel in one of the surfaces, the sealing element is positioned in the flow channel such that the fluid flow through the flow channel is blocked or permitted.

14. The device as claimed in claim 1, wherein
the sealing element is movable from the open position into the closed position or from the closed position into the open position by a fluid flow.

15. The device as claimed in claim 1, wherein
the sealing element is movable from the closed position into the open position or from the open position into the closed position by way of its elasticity.

16. The device as claimed in claim 1, wherein
a further part of the flow channel, which is situated opposite the part of the flow channel, is formed by a part of a filter, filter housing or air treatment device.

17. The device of claim 1 wherein the second height is less than half of a height of the sealing element.

18. A non-return valve device, comprising:
at least one part of a flow channel for a fluid;
a movable cord-shaped sealing element arranged in the flow channel, wherein
the sealing element is configured so as to be movable between first and second surfaces without at least partially being fixed to the first and second surfaces and so as to be moved movable at least partially between a closed position and an open position, wherein at least the first surface forms a part of the at least one part of the flow channel, wherein first and second sealing edges, which limit movement of the sealing element, extend between the first and second surfaces at an angle or perpendicularly with respect to a movement direction of the sealing element, wherein the first and second sealing edges have first and second heights respectively, wherein the first height is greater than the second height, and wherein the first sealing edge is positioned closer to the first surface than the second sealing edge, wherein
in the open position, a fluid flow is permitted through the flow channel, and
in the closed position, the fluid flow through the flow channel is blocked by form-fitting engagement between with the sealing element, the second sealing edge and the first surface;
two surfaces arranged concentrically with respect to a longitudinal axis of the device, which surfaces are perpendicular or inclined with respect to the longitudinal axis, or
a groove, wherein
multiple annularly arranged openings are formed in at least one of the surfaces or in the groove, wherein, in the closed position of the sealing element, a fluid flow through at least one of the openings is blocked by an annular sealing element which is arranged between the surfaces or in the groove and which surrounds the annularly arranged openings, and in the open position of the sealing element, a fluid flow through at least one of the openings is permitted by virtue of the annular sealing element being arranged such that at least one section of the sealing element is situated between the at least one opening and the longitudinal axis of the device.

19. A non-return valve device, comprising:
at least one part of a flow channel for a fluid;
a movable cord-shaped sealing element arranged in the flow channel, wherein
the sealing element is configured so as to be movable between first and second surfaces without at least partially being fixed to the first and second surfaces and so as to be moved movable at least partially between a closed position and an open position, wherein at least the first surface forms a part of the at least one part of the flow channel, wherein first and second sealing edges, which limit movement of the sealing element, extend between the first and second surfaces at an angle or perpendicularly with respect to a movement direction of the sealing element, wherein the first and second sealing edges have first and second heights respectively, wherein the first height is greater than the second height, wherein the second height is less than half of a height of a bypass channel defined between the second sealing edge and the first surface, and wherein the first sealing edge is positioned closer to the first surface than the second sealing edge, wherein
in the open position, a fluid flow is permitted through the flow channel, and
in the closed position, the fluid flow through the flow channel is blocked by form-fitting engagement between with the sealing element, the second sealing edge and the first surface.

* * * * *